A. E. RHOADES.
FRICTION CLUTCH PULLEY.
APPLICATION FILED APR. 8, 1919.
1,340,559.
Patented May 18, 1920.
2 SHEETS—SHEET 1.
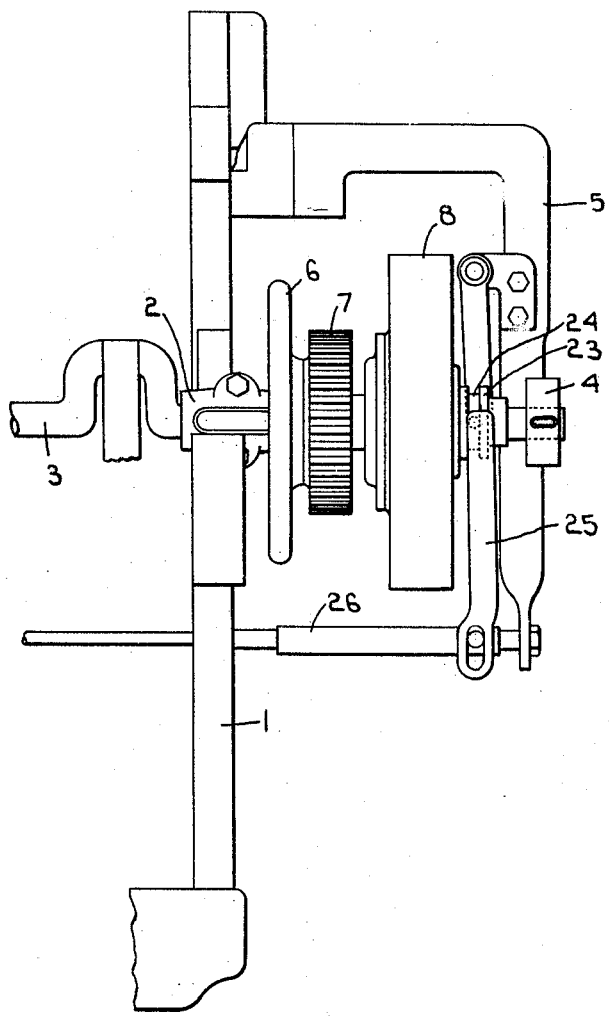
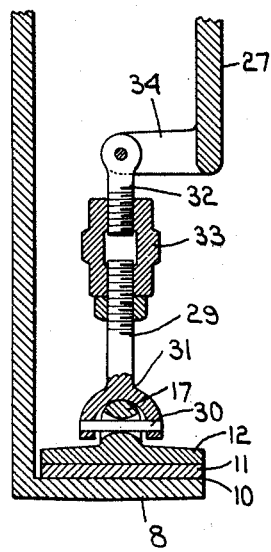
Inventor.
Alonzo E. Rhoades
by Heard Smith & Tennant
Attys.

A. E. RHOADES.
FRICTION CLUTCH PULLEY.
APPLICATION FILED APR. 8, 1919.
1,340,559.
Patented May 18, 1920.
2 SHEETS—SHEET 2.
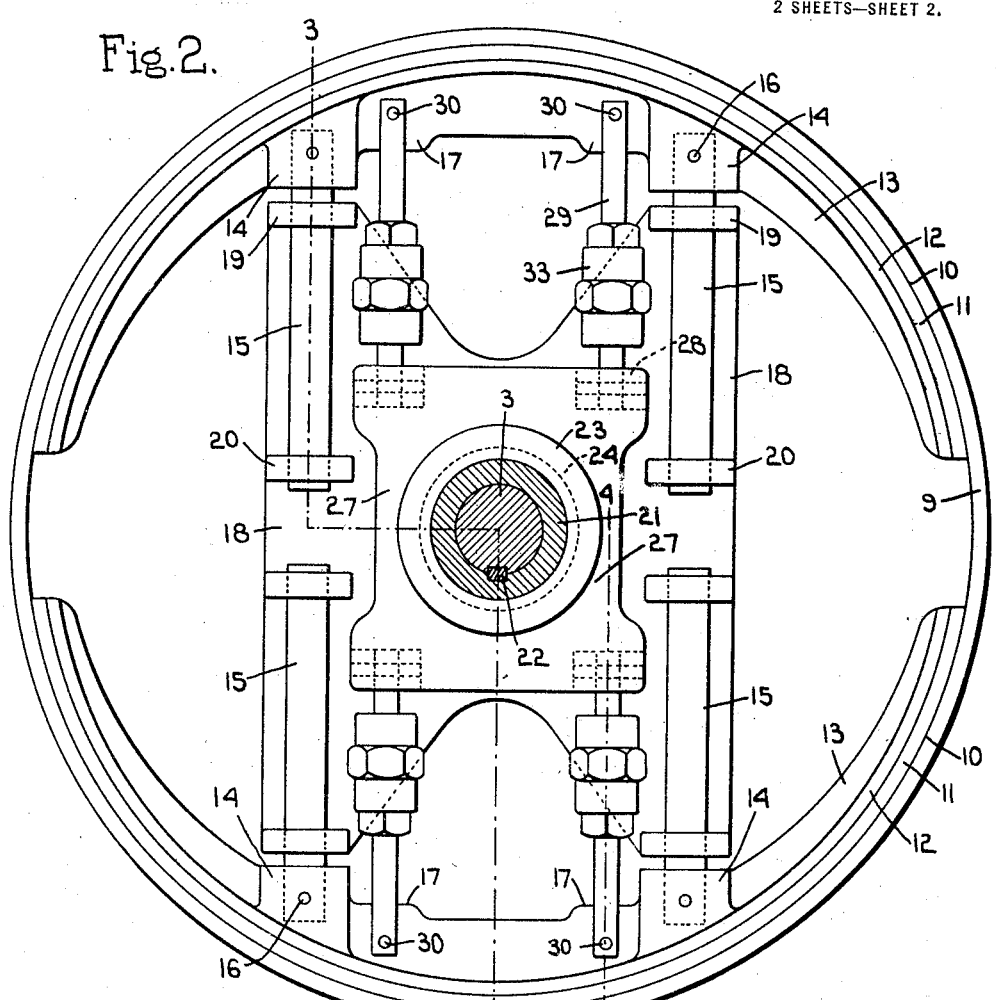
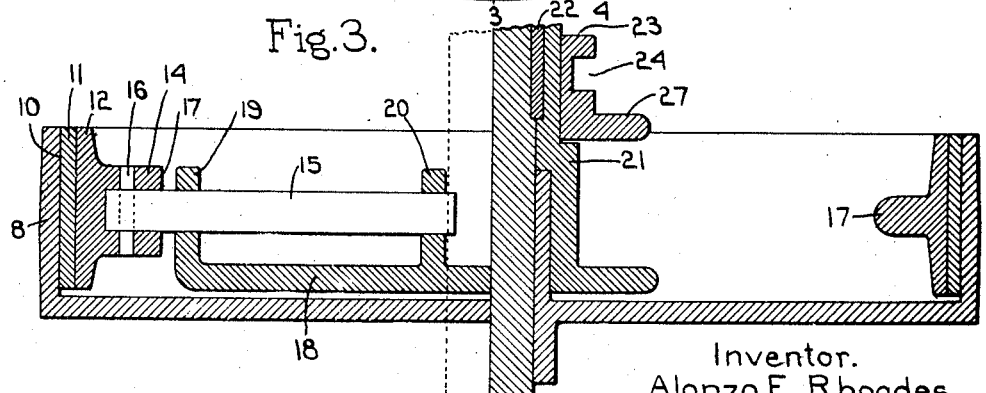
Inventor.
Alonzo E. Rhoades
by Heard Smith & Tennant
Attys.

UNITED STATES PATENT OFFICE.

ALONZO E. RHOADES, OF HOPEDALE, MASSACHUSETTS, ASSIGNOR TO DRAPER CORPORATION, OF HOPEDALE, MASSACHUSETTS, A CORPORATION OF MAINE.

FRICTION-CLUTCH PULLEY.

1,340,559.   Specification of Letters Patent.   Patented May 18, 1920.

Application filed April 8, 1919. Serial No. 288,457.

*To all whom it may concern:*

Be it known that I, ALONZO E. RHOADES, a citizen of the United States, residing at Hopedale, county of Worcester, State of Massachusetts, have invented an Improvement in Friction-Clutch Pulleys, of which the following description, in connection with the accompanying drawing, is a specification, like characters on the drawing representing like parts.

This invention relates to improvements in friction clutch pulleys such as are used to actuate the crank shaft of a loom, which is the main driving shaft, and the principal object of the invention is to produce a driving mechanism which will exert practically no end thrust on the driving shaft, thereby eliminating the friction and wastage of power occasioned by the usual disk or conical form of friction drives.

Another object of the invention is to provide a novel form of friction clutch in which a true radial movement of the clutch shoes will be insured.

A further object of the invention is to provide means which may be adjusted to cause both ends of diametrically oppositely disposed clutch shoes to be forced against the pulley rim with equal pressure so that a maximum gripping action will be obtained and the shoes caused to wear more uniformly.

A preferred embodiment of the invention is illustrated in the drawings as applied to the crank shaft of a loom but it will be understood that the invention is capable of general use.

In the drawings—

Figure 1 is a plan view of a sufficient portion of the loom to illustrate my invention as applied thereto;

Fig. 2 is a side elevation of a preferred form of friction clutch pulley embodying my invention, the driving shaft and sleeve for the clutch shoe supporting member being shown in section;

Fig. 3 is a sectional view on the broken line 3—3, Fig. 2;

Fig. 4 is a detail sectional view through a portion of the pulley, the clutch shoe and the members for actuating the clutch shoe also illustrating the turnbuckle arrangement by means of which the thrust member may be adjusted.

Inasmuch as the subject matter of the invention relates to the friction clutch pulley for driving the mechanism of the loom only, it is unnecessary to show in detail the loom mechanism other than the crank shaft and such parts of the loom side as are necessary to support the mechanisms directly concerned with the invention. The loom may be of the usual character comprising a loom side 1 having a journal 2 for the crank shaft 3, the opposite end of said crank shaft being supported in a journal 4 carried by a bracket 5 which is secured by suitable means to the loom side. Intermediate of the bearing 2 on the loom side and the bearing 4 upon the bracket various mechanisms including the driving pulley are mounted. For example, as illustrated herein the hand wheel 6 for turning the loom over manually and the gear 7 for actuating certain of the parts of the loom are disclosed as lying between the journal boxes 2 and 4. The pulley also embodying the invention is similarly located.

In usual loom constructions the crank shaft is driven through a pulley having a flat frictional face which engages a frictional disk secured to the shaft and in such constructions the constant pressure upon the pulley necessary to produce a driving friction causes an endwise thrust upon the shaft which is taken up by the hub of the hand wheel or the gear or a suitable collar which abuts against the end of a journal box. This causes a considerable waste of power and the present invention contemplates the production of a friction driving pulley in which there will be no endwise thrust upon the shaft. The preferred mechanism illustrated comprises a pulley 8, rotatably mounted upon the crank shaft 3, having a cylindrical rim 9 which is provided with a cylindrical inner face 10 which is engaged by a frictional facing 11 upon the clutch shoes 12 which desirably are diametrically oppositely disposed. Each of the clutch shoes 12 is provided with a strengthening rib 13 and also desirably is provided with apertured bosses 14 in which guide rods 15 are securely anchored as by pins 16 extending through said bosses and said guide rods. Portions of each of the ribs of the clutch shoes are rounded to provide bearing surfaces 17 for the thrust members which will hereinafter be described. The guide rods 15 are slidably mounted in journals in a clutch shoe supporting member 18. Preferably two of such bearings 19 and 20 are provided for each guide rod, said bearings being spaced apart a sufficient distance to insure a direct radial movement of the clutch shoes. The clutch shoe supporting member 18 has a hub 21 which is secured to the crank shaft 3 by a feather or spline 22 so that the clutch shoe supporting member and the clutch shoes will rotate with the shaft, or vice versa, the rotation of the clutch shoes by the pulley will cause the rotation of the shaft.

The guide rods 15 of the clutch shoes are spaced apart a considerable distance on either side of the center of the clutch shoe so that by reason of the long distance between the bearings 19 and 20 the end portions of the clutch shoe will be accurately guided toward the inner face of the rim of the pulley. Any suitable expanding means may be utilized for the purpose of forcing the clutch shoes into engagement with the rim of the pulley. The preferred embodiment which is illustrated herein comprises a sleeve 23 having a circumferential groove 24 to receive the fork of the shipper lever 25 which may be operated through the usual shipping rod 26 (see Fig. 1) and thrust members operated by the longitudinal movement of said sleeve to force the clutch shoes into engagement with the clutch. As illustrated in Fig. 2 the body of the sleeve which as shown in elevation, is formed with an integral preferably rectangular block 27, the corners of which are provided with bosses 28 upon which the thrust members 29 are pivoted at their inner ends. At their outer ends the thrust members are bifurcated and present concave bearing surfaces adapted to engage the rounded surfaces 17 upon the clutch shoes, which preferably are located adjacent to the sockets in which the guide rods 15 are mounted. The thrust members 29 are also secured at their outer ends to the clutch shoe by pins 30 which pass through apertures having their walls entering from opposite sides reversely tapered. This construction produces substantially a universal joint so that the clutch shoe may accommodate itself to the surface of the pulley rim.

The thrust members 29 desirably are extensibly adjustable and comprise two parts, the part 31 which has the bifurcated extension and the part 32 which is connected to it by a turnbuckle 33. The member 32 is connected to brackets or lugs 34 upon the block 27 which forms part of the sleeve which is actuated by the shipping lever 25 to apply the clutch or remove it from the pulley. By reason of the fact that these thrust members are connected to the clutch shoes at points remote from and upon opposite sides of the middle of the clutch shoes each end of the clutch shoe is independently adjustable and can be adjusted in such a manner as to force both ends of both clutch shoes against the pulley rim with equal pressure thereby providing a maximum clutching efficiency. They can also be adjusted independently to take up wear so that this maximum efficiency may be maintained. It will be noticed by reference to Fig. 1 that the frictional clutch pulley is self-contained, that is to say, all of the clutch mechanism and mechanism for actuating the same are within the periphery of the pulley face.

In the operation of the device a movement of the shipper rod 26 (to the left) will cause the lever 25 to be moved toward the left and thereby to shift the expanding means sufficiently to cause the thrust members, which are in effect toggle members, to straighten and thereby force the clutch shoes firmly into engagement with the cylindrical rim of the pulley. Inasmuch as the action of the thrust members is substantially radial no endwise pressure will be placed upon the shaft and consequently there will be no unnecessary wearing between the gears or collars on the shaft and the journal bearings which support the shaft.

It will be understood that the embodiment of the invention disclosed herein is of an illustrative character and is not restrictive and that various modifications in construction and arrangement of parts may be made within the spirit and scope of the following claims.

Having thus described my invention what I claim as new and desire to secure by Letters Patent is:

1. A friction clutch pulley comprising a pulley having a cylindrical rim, diametrically oppositely disposed clutch shoes, having central strengthening ribs presenting rounded faces, a clutch shoe supporting member having pairs of bearings spaced apart, guide rods rigidly secured to each clutch shoe extending through a pair of said bearings, an expander movable toward and from said clutch supporting member, comprising a sleeve, thrust members pivotally connected thereto and provided with bifurcated outer ends presenting concaved sockets to engage the rounded faces of said central ribs, and means connecting said bifurcated ends to said ribs whereby the movement of said expander will cause positive movement of the clutch shoes in both directions.

2. A friction clutch pulley comprising a pulley having a cylindrical rim, diametrically oppositely disposed clutch shoes, having central strengthening ribs presenting rounded faces, a clutch shoe supporting member having pairs of bearings spaced apart, guide rods rigidly secured to each clutch shoe extending through a pair of said bearings, an expander movable toward and from said clutch supporting member, comprising a sleeve, pairs of thrust members located adjacent to and in parallelism with said guide rods, pivotally connected to said sleeve and provided with bifurcated outer ends presenting concaved sockets to engage the rounded faces of said central ribs, and means connecting said bifurcated ends to said ribs whereby the movement of said expander will cause positive movement of the clutch shoes in both directions.

3. A friction clutch pulley comprising a pulley having a cylindrical rim, diametrically oppositely disposed clutch shoes, having central strengthening ribs presenting rounded faces, a clutch shoe supporting member having pairs of bearings spaced apart, guide rods rigidly secured to each clutch shoe extending through a pair of said bearings, an expander movable toward and from said clutch supporting member, comprising a sleeve, thrust members pivotally connected thereto and provided with bifurcated outer ends presenting concaved sockets to engage the rounded faces of said central ribs, said ribs being provided with reversely tapered apertures, and pins seated in the bifurcated ends of said thrust members passing through said apertures.

In testimony whereof I have signed my name to this specification.

ALONZO E. RHOADES.